United States Patent
Berenbaum et al.

(10) Patent No.: US 6,272,144 B1
(45) Date of Patent: *Aug. 7, 2001

(54) IN-BAND DEVICE CONFIGURATION PROTOCOL FOR ATM TRANSMISSION CONVERGENCE DEVICES

(75) Inventors: Alan David Berenbaum, New York, NY (US); Alexander Gibson Fraser, Bernardsville; Hubert Rae McLellan, Jr., Summit, both of NJ (US)

(73) Assignees: Agere Systems Guardian Corp., Orlando, FL (US); AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,746

(22) Filed: Sep. 29, 1997

(51) Int. Cl.7 .................................. H04L 12/56
(52) U.S. Cl. ............................. 370/419
(58) Field of Search .................. 370/359, 360, 370/381–384, 419, 420, 395, 389, 410, 242, 244, 248, 249

(56) References Cited

U.S. PATENT DOCUMENTS

| | | | |
|---|---|---|---|
| 4,495,614 | * | 1/1985 | Aro et al. ............... 370/384 |
| 4,504,942 | * | 3/1985 | Aro et al. ............... 370/359 |
| 4,527,266 | * | 7/1985 | Bogan et al. ............ 370/359 |

(List continued on next page.)

OTHER PUBLICATIONS

PMC–Sierra Advance Information Data Sheet, PM5355 S/UNI–622 Saturn User Network Interfaces, PMC–Sierra, Inc., Burnaby, BC, Canada, pp. 7–9, Oct. 1994.

Integrated Device Technology Communications Products, 1997 Data Book, IDT77105 PHY (TC–PMD), Integrated Device Technology, Inc., Santa Clara, CA, pp. 8.02–1 to 8.02–3, 8.02–8 and 8.02–9, 1995.

(List continued on next page.)

Primary Examiner—Melvin Marcelo
Assistant Examiner—Jasper Kwoh
(74) Attorney, Agent, or Firm—Ryan, Mason & Lewis, LLP

(57) ABSTRACT

Line card control in an ATM or other packet-based switch is provided using an in-band device configuration in which control messages from a control processor of the switch are transmitted in one or more cells to a transmission convergence device in a line card. The transmission convergence device filters a stream of cells received in the line card in order to identify cells including control messages directed to the line card. The transmission convergence device then executes one or more commands associated with a given control message. Each control message may be transmitted in a single cell including a header and a payload. A message trailer portion of the payload may include device-specific data which specifies an interpretation of the payload structure. For example, the payload may include a series of commands, each including a read or write opcode, an address, and a data field. Alternatively, the device-specific data may indicate that the payload includes a single read command, with a longer address and a larger data field. The message trailer may also include a CRC field which is compared with a CRC computed for the payload to determine whether the control message should be accepted or rejected, and a pass-through data field which is returned unmodified from the line card as part of an acknowledgment of receipt and execution of the control message.

31 Claims, 3 Drawing Sheets

U.S. PATENT DOCUMENTS

| | | | | |
|---|---|---|---|---|
| 4,589,106 | * | 5/1986 | Prather et al. | 370/359 |
| 5,414,704 | * | 5/1995 | Spinney | 370/389 |
| 5,461,607 | * | 10/1995 | Miyagi et al. | 370/244 |
| 5,513,179 | * | 4/1996 | Maas | 370/359 |
| 5,570,355 | * | 10/1996 | Dail et al. | 370/352 |
| 5,859,846 | * | 1/1999 | Kim et al. | 370/389 |
| 5,923,658 | * | 7/1999 | Shtayer et al. | 370/399 |
| 5,933,607 | * | 8/1999 | Tate et al. | 395/200.7 |
| 6,128,766 | * | 10/2000 | Fahmi et al. | 714/807 |

OTHER PUBLICATIONS

Advance Data Sheet, T7254 Four–Port ISDN User–Network Interface Termination for Switches from the Microelectronics Group of Lucent Technologies, formerly AT&T Microelectronics, of Allentown, PA, pp. 17–19, 1989.

A.G. Fraser, "DATAKIT—A Modular Network for Synchronous and Asynchronous Traffic," ICC '79 Conference Proceedings, Jun. 10–14, Boston, MA, vol. 2, pp. 20.1.1–20.1.3, 1979.

G.L. Chesson, "Datakit Software Architecture," ICC '79 Conference Proceedings, Jun. 10–14, Boston, MA, vol. 2, pp. 20.2.1–20.2.5, 1979.

G.L. Chesson and A.G. Fraser, "Datakit Network Architecture," COMPCON '80 Conference Proceedings, Feb. 25–28, San Francisco, CA, pp. 59–61, 1980.

A.G. Fraser, "A Virtual Channel Network," Datamation, vol. 21, pp. 51–53 and 56, Feb. 1975.

* cited by examiner

IN-BAND DEVICE CONFIGURATION PROTOCOL FOR ATM TRANSMISSION CONVERGENCE DEVICES

FIELD OF THE INVENTION

The present invention relates generally to asynchronous transfer mode (ATM) communication systems and devices and more particularly to techniques for providing in-band line card control capabilities in an ATM switch or other packet-based switch.

BACKGROUND OF THE INVENTION

An ATM communication system provides high-speed, low-delay switching of voice, data, video and other types of user information traffic. In an ATM system, the user information traffic is separated into fixed-length 53-byte cells. Each ATM cell typically includes a 5-byte header and a 48-byte payload. The header incorporates a virtual channel identifier (VCI) and a virtual path identifier (VPI) associated with the corresponding cell. The VCI and VPI together specify a virtual connection (VC) which is established when a user requests a network connection in the ATM system. Additional details regarding these and other aspects of ATM systems can be found in the ATM Forum, "ATM User-Network Interface Specification," Version 3.1, September, 1994, and in Martin de Prycker, "Asynchronous Transfer Mode: Solution for Broadband ISDN," Ellis Horwood, N.Y., 1993.

FIG. 1 shows a typical ATM switch 10. The switch 10 includes a control processor 12 which directs the operation of a switch fabric 14. The switch fabric in turn drives N line cards 16-i, i=1, 2, ... N. Each of the N line cards 16-i serves to interface the switch 10 to a corresponding physical link or trunk of an established ATM network connection. For example, one of the N line cards may interface with a computer of a network user, while another one of the line cards interfaces with a physical layer of a communication network, so as to allow the user to communicate over the physical layer of the network via the ATM switch 10. The control processor 12 is responsible for configuring and maintaining the switch 10. FIG. 2 illustrates one of the line cards 16-i in greater detail. The line card 16-i includes a Utopia port 22, a transmission convergence (TC) device 24, a physical media dependent (PMD) device 26, and a synchronous optical network (SONET) port 28. The transmission convergence device 24 interfaces an ATM cell-based switch fabric interconnect, such as the Utopia port 22, to a bit-level physical layer interconnect, such as SONET port 28. The line card 16-i further includes a utility bus 30, a utility bus interface 32, a local microprocessor 34, a random access memory (RAM) 36, and a read-only memory 38. The elements 30, 32, 34, 36 and 38 are used to provide configuration, status and other control functions for the line card 16-i. The utility bus 30 is a global utility bus used to provide communication between the N line cards of switch 10 so that the local microprocessors in the line cards can, for example, coordinate configurations or collect statistics.

A significant problem with the conventional ATM switch line card arrangement shown in FIG. 2 is the added expense and complexity associated with providing a separate utility bus interface and microprocessor-based control circuitry for each of the line cards. Although the utility bus 30 can be of lower bandwidth than the ATM switch 10, it still needs to be scaled with the size of the switch, and potentially may be required to interconnect hundreds of line cards. The cost of this separate line card control hardware can therefore be excessive. Moreover, the transmission convergence device 24 is required to include additional input/output pins for interfacing with the control hardware, and therefore its die size, package size and power consumption are unduly increased. Other types of conventional line cards do not include a local microprocessor, but instead utilize an on-board microcontroller to interface via a separate line card control bus to a central controller which provides configuration, status and other types of control processing for the line cards. Although the hardware cost of such cards may be less than that of cards including a local microprocessor, the use of the separate control network for providing line card configuration and control still unduly increases the size, cost and complexity of the transmission convergence device, the line card and the ATM switch.

Most conventional ATM switches thus utilize line cards which include some type of separate line card control bus and control hardware. Examples of conventional transmission convergence devices for use in line cards such as that shown in FIG. 2 include the PM5355 S/UNI-622 and PM5346 S/UNI-155-LITE Saturn User Network Interfaces from PMC-Sierra, Inc. of Burnaby, BC, Canada, the IDT77105 PHY (TC-PMD) from Integrated Device Technology, Inc. of Santa Clara, Calif., and the T7254 Four-Port ISDN User-Network Interface Termination for Switches from the Microelectronics Group of Lucent Technologies, formerly AT&T Microelectronics, of Allentown, Pa. These exemplary transmission convergence devices are designed for integration into a line card, and each is designed to support a separate control bus for the line card. The size, cost and complexity of such devices could be considerably reduced if a mechanism was available for providing line card control without the need for a separate line card control bus or other separate control interface. It is therefore apparent that a need exists for improved line card control techniques for use in ATM switches and other packet-based communication devices.

SUMMARY OF THE INVENTION

The invention in an illustrative embodiment uses an existing ATM connection to provide line card control operations in an ATM switch, thereby completely eliminating the need for a separate line card control bus or other control interface, and considerably reducing the size, cost and complexity of the line card, its transmission convergence device, and the ATM switch. In the illustrative embodiment, control messages from a control processor of the ATM switch are transmitted in one or more ATM cells to a transmission convergence device in the line card. The transmission convergence device filters a stream of cells received in the line card in order to identify cells including control messages directed to the line card. The filtering operation generally involves attempting to match a VPI/VCI portion of a cell header to a specified VPI/VCI address associated with the control messages. After a cell containing a control message cell is identified, the transmission convergence device executes one or more commands associated with the control message. The invention may also be implemented in other types of packet-based communication systems.

In accordance with the invention, each control message may be transmitted in a single cell which includes a header and a payload. A message trailer portion of the payload may include a device-specific data (DSD) field which specifies an interpretation of the payload structure. The message trailer may also include a cyclic redundancy code (CRC) field which is compared with a CRC computed for the cell payload to determine whether the control message sent in the cell should be accepted or rejected. A pass-through data (PTD) field in the message trailer may be returned unmodified from the line card to the switch control processor as part of an acknowledgment of receipt and execution of the corresponding control message.

The present invention considerably simplifies line cards and the corresponding switches by eliminating the need to provide a separate line card control interface. The in-band device configuration of the invention can completely eliminate the need for a utility bus to interconnect multiple line cards, as well as the control hardware associated with the utility bus interface. It can substantially reduce the number of input/output pins required in a transmission convergence device, such that the device can be implemented with a smaller die, a smaller package and lower power dissipation. The in-band device configuration of the invention supports functions such as remote configuration, error reporting and statistics gathering for multiple line cards. For example, a remote agent can use the control processor of an ATM switch to access all line cards in the switch by sending control messages in ATM cells through the switch fabric. The protocol is robust, in that all messages may be checked with a CRC to prevent a corrupted message from affecting line card hardware. Since all messages and all commands within a message can be acknowledged, a set of control software can readily determine the state of the line cards and can verify that requested actions are taken. By reducing the size, cost and complexity of line cards while increasing the reliability of control software, the in-band device configuration of the invention provides significant advantages in a wide variety of communication device applications. These and other features and advantages of the present invention will become more apparent from the accompanying drawings and the following detailed description.

DETAILED DESCRIPTION OF THE INVENTION

The present invention will be illustrated below in conjunction with exemplary ATM processing hardware. It should be understood, however, that the disclosed techniques are suitable for use with a wide variety of other types of packet-based processing hardware. The term "in-band" refers generally to the delivery of control data to a transmission convergence device or other processing device within an existing cell structure. A "line card" as the term is used herein is intended to include any device which serves as an interface in an communication system switch between, for example, an ATM cell signal path and a physical layer of a network or other communication medium. The term "cell" as used herein is intended to include not only ATM cells but also other types of data packets used in other packet-based communication systems.

Figure 2:
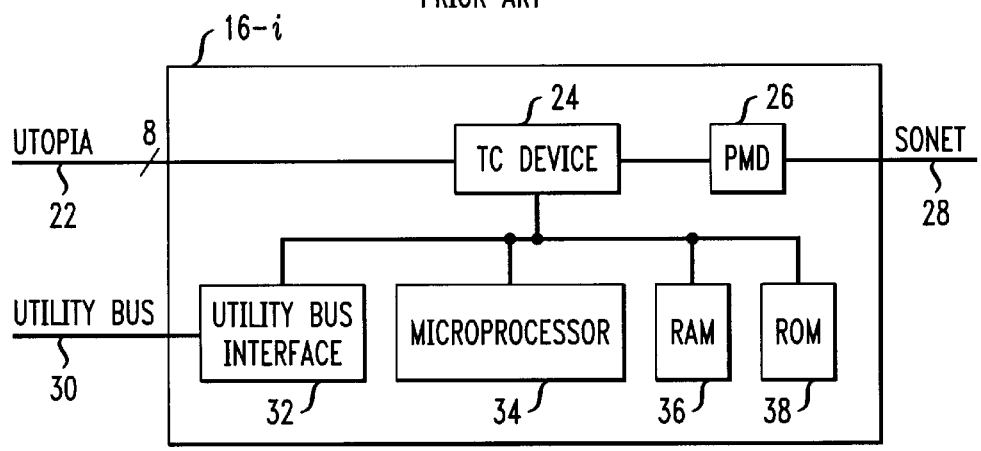
FIG. 2 is a block diagram of one of the line cards in the prior art ATM switch of FIG. 1.
Figure 3:
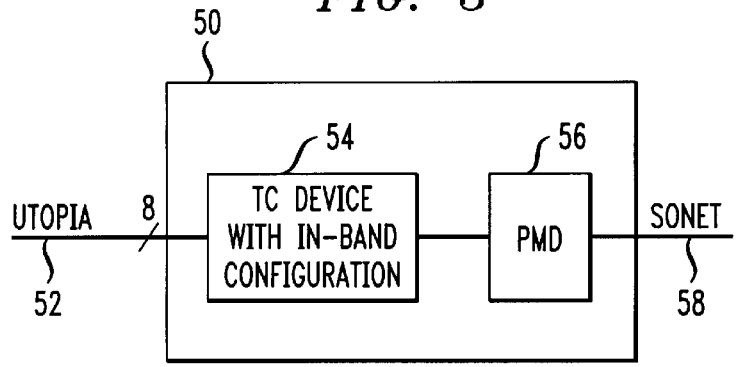
FIG. 3 shows an illustrative line card configured in accordance with one embodiment of the invention.

FIG. 3 shows a line card 50 configured in accordance with an illustrative embodiment of the invention. The line card 50 includes an 8-bit ATM Utopia port 52, a transmission convergence (TC) device 54 with an in-band control configuration to be described in detail below, a physical media dependent (PMD) device 56, and a synchronous optical network (SONET) port 58. As in the conventional line card of FIG. 2, the transmission convergence device 54 interfaces the Utopia port 52, which is part of an ATM cell-based switch fabric interconnect, with the SONET port 58, which is part of a bit-level physical layer interconnect. The PMD device 56 serves as an interface between the transmission convergence device 54 and the physical communication medium coupled to SONET port 58. Unlike the conventional line card of FIG. 2, the illustrative line card 50 of the present invention does not include a separate utility bus, local microprocessor bus, or other separate line card interface for communicating configuration, status and other control information between multiple line cards of an ATM switch. Significantly, the invention makes use of the above-noted in-band configuration of the transmission convergence device 54 to transfer control information to and from the line card 50. Advantageously, this eliminates the need for a separate communication interface for transferring control information to and from the line card. The cost and complexity of the line card is considerably reduced because the utility bus, local microprocessor, or other control interface hardware, as well as any associated connector pins, can be removed from the card.

Figure 1:
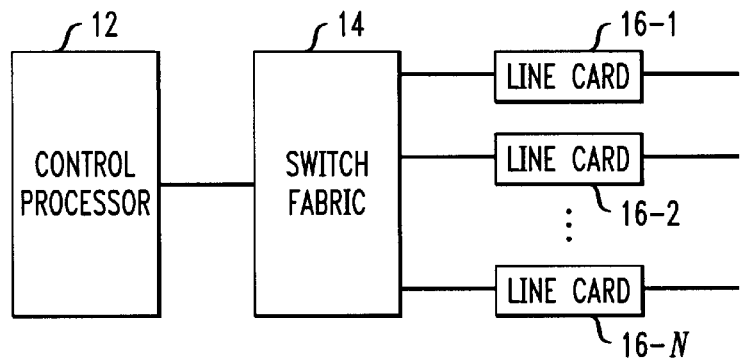
FIG. 1 is a block diagram of a typical ATM switch in accordance with the prior art.

The operation of transmission convergence device 54 with in-band configuration will now be described in greater detail. In accordance with the invention, an ATM switch fabric, which connects multiple line cards of a typical ATM switch to a control processor in the manner shown in FIG. 1, is used to transfer control information to the transmission convergence device 54 along the same path as the ATM data flow. The control information is used, for example, to configure the transmission control device 54, as well as to check on status and error conditions. This in-band transfer of control information to and from the line card 50 allows the control processor to read and write registers within the transmission convergence device 54, and as previously noted eliminates the need for any separate control bus or other mechanism for linking the line cards.

A communication protocol is used to provide the in-band transfer of control information to and from the transmission convergence device 54. The protocol may be configured to provide access to the entire register space of a given line card. Because errors can occur in the transmission of a message, the protocol should protect against corruption of the message and prevent spurious changes to device state. Moreover, the protocol preferably includes internal checks and acknowledgments to promote software reliability. To minimize hardware costs, the protocol should be simple to implement in an ATM device, and should not require extensive additions to the data paths. An exemplary protocol in accordance with the invention providing these and other features is of a type known as a "request-response" protocol with get/set primitives and a one-packet window.

In accordance with an illustrative embodiment of the exemplary request-response protocol, pairs of control and acknowledge messages are exchanged between a control processor and an ATM transmission convergence device. A control message includes a series of commands to read and write registers, along with error checking and messaging overhead. All communication may be initiated by the control processor, which sends a message to the transmission convergence device, and all control messages may be acknowledged by a return message sent back to the control processor. The acknowledge message may be a modified version of the control message, using the same header. A single ATM cell is used for each message, and the transmission convergence device processes only one message at a time. Other messages received while a previous message is being processed may be discarded. This single-cell message arrangement allows the transmission convergence device to be configured using a single-cell buffer, which is simpler and less costly to implement than a multi-cell buffer. The use of a single ATM cell as the unit of communication between the control processor and the transmission convergence device not only reduces the amount of message storage required, but also avoids the need for providing segmentation and reassembly (SAR) operations in the transmission convergence device, and minimizes the likelihood of errors and lost messages.

Figure 4:
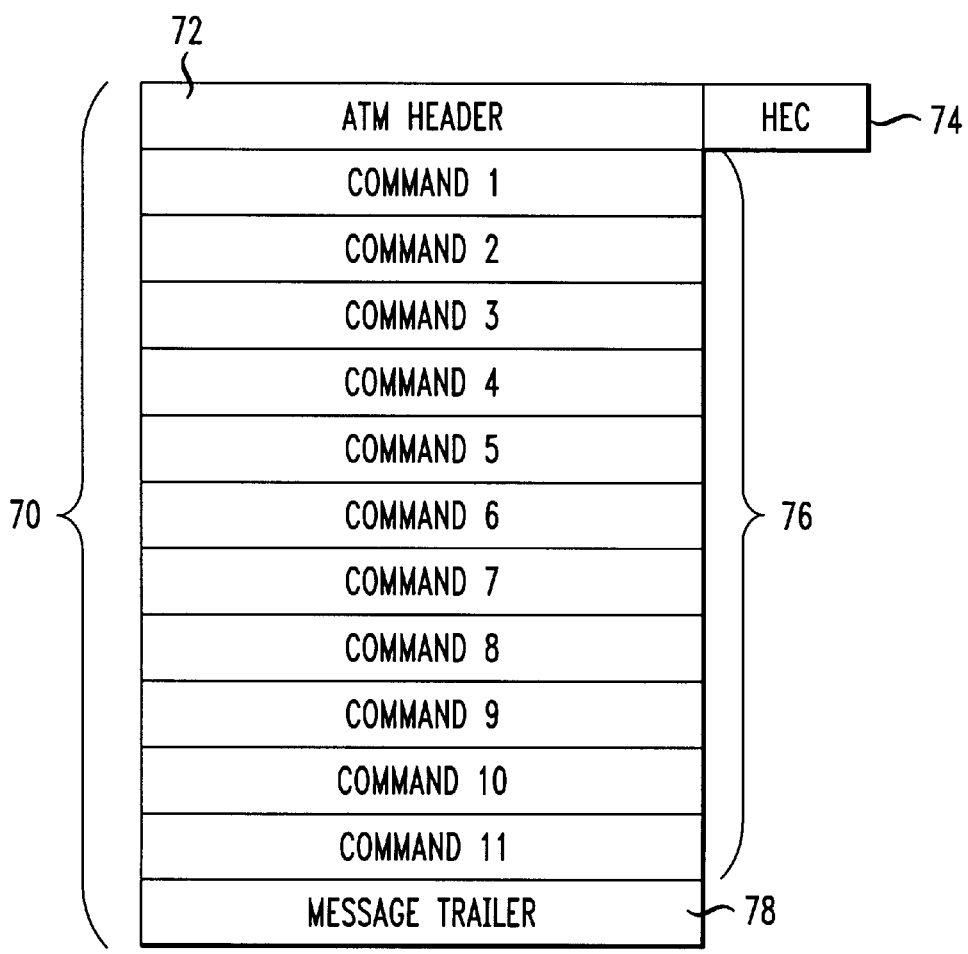
FIG. 4 illustrates the message format of an ATM cell configured for use with the line card of FIG. 3 in accordance with the invention.

FIG. 4 illustrates the message format of a single 53-byte ATM cell 70 configured for use in transferring control information between a control processor and the transmission convergence device 54 in accordance with the above-described illustrative protocol. The ATM cell 70 includes a 4-byte header 72, a header error correction (HEC) byte 74, and a 48-byte cell payload including twelve 4-byte words. The HEC byte is often considered part of the ATM cell header, such that the header includes a total of five bytes. The first eleven 4-byte words of the payload are a series of 32-bit commands 76, and the last word is a message trailer 78 which contains overhead associated with the protocol. It will be assumed that the last byte of the 48-byte payload is the low-order byte of the twelfth 32-bit word of the payload, although other arrangements are also possible. A given ATM cell received in the transmission convergence device 54 via the Utopia port 52 from the control processor is identified by device 54 as a control message by the presence of a specific virtual path indicator (VPI)/virtual channel indicator (VCI) address in the ATM header 72. The address may be taken from the range of addresses reserved by the ATM Forum for intra-switch communication.

Figure 5:
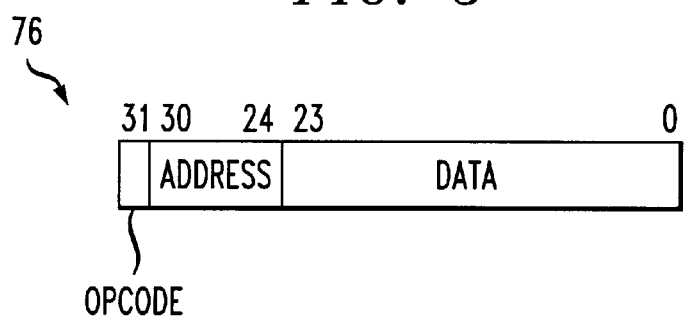
FIGS. 5 and 6 show the command word and message trailer formats, respectively, in the message format of FIG. 4.
Figure 6:
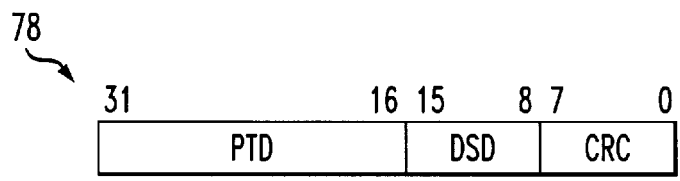

FIGS. 5 and 6 show more detailed views of the command word and message trailer formats, respectively, of the message format of FIG. 4. FIG. 5 indicates that a given 32-bit command word includes a 1-bit opcode, a 7-bit address and a 24-bit data field. In this embodiment, the opcode identifies one of two possible operations, read and write, and the address field identifies a particular one of 128 internal registers in the transmission convergence device 54. Any internal data that requires more than 24 bits may be split across two or more internal registers.

FIG. 6 indicates that the message trailer 78 includes a 16-bit pass-through data (PTD) field, and 8-bit device-specific data (DSD) field, and a one-byte cyclic redundancy code (CRC) field. The PTD field is returned without modification to the control processor as part of the above-described acknowledgment message. It may be used as a sequence number, so that control software can match return values with control requests and identify lost messages. The DSD field contains data that may be relevant to a specific transmission convergence device. It may also be returned unmodified to the control processor as part of the acknowledgment message. It can be used, for example, to extend the internal register space of the transmission convergence device beyond seven bits, or it can be used to change the interpretation of the commands entirely. For example, the DSD field may include one or more "version" bits. In one possible embodiment, a single version bit is used to identify the control message as including either eleven one-word (4-byte) commands as described above, or a single read command with a 32-bit memory address and 40 byte data field. The former is well-suited for addressing multiple configuration registers, while the latter is designed for reading large amounts of data from, for example, a read-only memory (ROM) associated with the line card. The DSD field of the message trailer may thus be used to alter the interpretation of the payload in a control message cell. The 8-bit CRC field of the message trailer as shown in FIG. 6 includes a CRC generated over the entire 48-byte cell payload. A simple CRC of byte-XOR may be used, so that control software can generate and check it easily.

Figure 7:
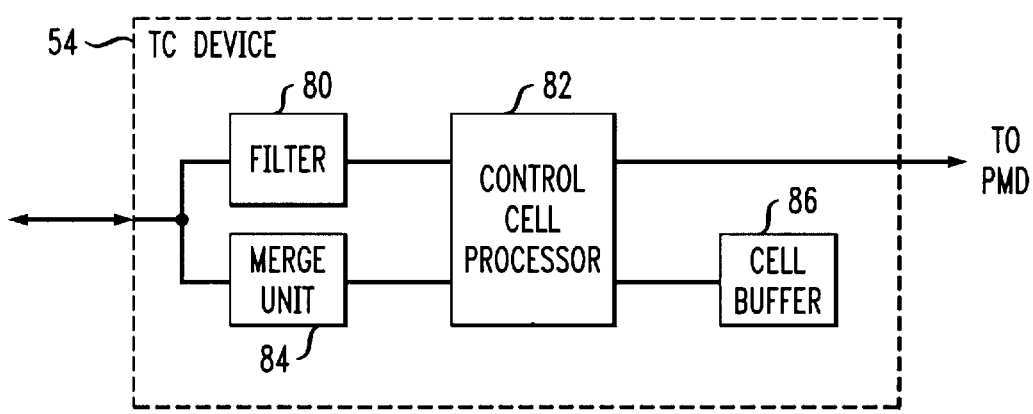
FIG. 7 is a block diagram of a transmission convergence device suitable for use in the line card of FIG. 3.

FIG. 7 shows a more detailed view of the transmission control device 54 with in-band configuration in accordance with the invention. The in-band configuration is implemented using a filter 80 to separate control messages from the incoming ATM data stream received from the switch fabric, a control cell processor 82 to process the commands in a control message, and a merge unit 84 to insert the acknowledgment message into the ATM data stream going to the switch fabric. It should be noted that the transmission convergence device 54 may also include a number of other elements, not shown in FIG. 7, for performing conventional cell processing operations. The filter 80 scans the header of every incoming ATM cell to identify control messages of the form described in conjunction with FIGS. 4, 5 and 6 above. The filter either passes a cell through to the PMD device 56, or discards it. It identifies control messages by matching the VPI/VCI field in the cell header to the above-noted reserved intra-switch signaling VPI/VCI address. One possible implementation fixes Global Flow Control and Payload Data Type portions of the header as well as the VPI/VCI field, and performs a check for an exact match on the entire header and HEC field. This makes it unnecessary to calculate the header CRC, but introduces a 5-byte delay in the transmission of the ATM cell while the filter checks the header. As long as the filter can process cells at the full data rate, this delay will not slow down the rest of the ATM cell processing in transmission convergence device 54.

The control cell processor 82 monitors the incoming ATM data stream and saves control messages identified by the filter 80 in a single-cell buffer 86. The processor 82 computes a CRC as the bytes of the cell are copied into the cell buffer. If the computed CRC for the payload does not match the CRC field in the $48^{th}$ byte of the payload, the cell payload is ignored and the control cell processor 82 continues to monitor the incoming ATM cells. Otherwise, the ATM cell is assumed to be a valid control message and the control cell processor 82 executes the eleven commands of the control message in sequence. The control cell processor 82 in this illustrative embodiment operates on only one control message at a time and ignores the ATM data stream until the corresponding acknowledge message is sent. It should be noted that the filter 80 continues to discard control cells from the ATM data stream during this time, so that control messages that arrive before the acknowledge message is sent are lost. The control cell processor 82 may also perform conventional cell processing operations in the transmission convergence device 54.

As noted in conjunction with FIG. 5 above, a given command word may include a read command or a write command. A read command replaces the 24-bit data field of the command with the contents of the addressed register. A write command updates the addressed register with the contents of the 24-bit data field. There are no error conditions in this illustrative embodiment. A read of a non-existent register returns the value zero, and a write of a non-existent register results in no operation. Reads of registers less than 24 bits long may be zero-extended. All eleven commands in the control cell are typically executed in sequence. After a control cell is executed, the completed acknowledgment message resides in the cell buffer 86, except for the its CRC. As noted above, the header of the acknowledge cell is the same as the ATM cell header of the control message.

The merge unit 84 inserts the acknowledge message into the ATM data stream directed towards the switch when no other switch-bound ATM cell is available. While the acknowledge cell is transmitted, a payload CRC is computed for the cell, and placed in the $48^{th}$ byte of the acknowledge cell payload. When the CRC is sent, the control cell processor 82 again becomes idle, and resumes acquiring potential ATM control messages. If the bit rate of the switch-side interface is faster than that of the physical media side, then there will generally be sufficient time to insert the acknowledge cell.

Figure 8:
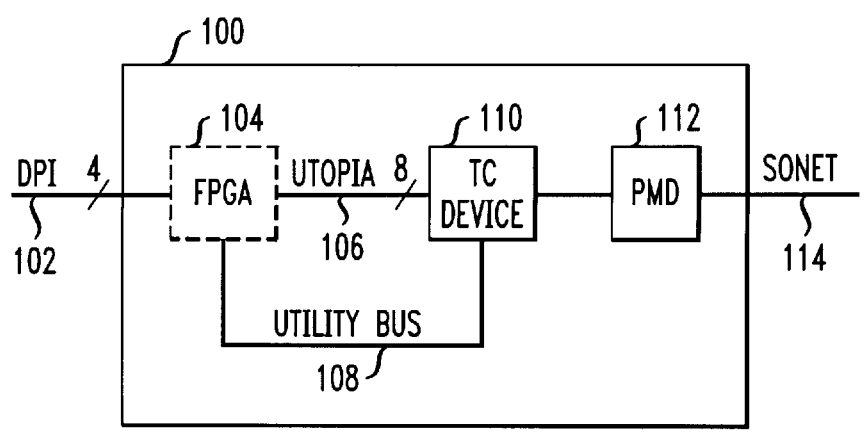
FIG. 8 illustrates a line card implementing an exemplary in-band device protocol in accordance with the invention.

FIG. 8 shows a line card 100 configured to demonstrate the operation of the above-described in-band device protocol. The line card 100 includes a bidirectional 4-bit data path interface (DPI) 102, a field-programmable gate array (FPGA) 104, a Utopia bus 106, a utility bus 108, and a conventional transmission convergence (TC) device 110. In this embodiment, the transmission convergence device 110 may be one of the conventional transmission convergence devices mentioned above, and the FPGA may be an ORCA 2C06 from Lucent Technologies. The output of the transmission convergence device drives a PMD device 112 which provides an interface to a SONET port 114. The line card 100 utilized the FPGA 104 to implement the above-described in-band device protocol using the conventional transmission convergence device 110. The utility bus 108 was used in this embodiment as a local bus for interconnecting a microprocessor port of the transmission convergence device 110 with the FPGA 104, rather than as a global bus providing an interconnection with other line cards or a control processor as in the line card of FIG. 2. The protocol was implemented using fifteen pages of VHDL code stored in the FPGA 104. Read and write commands were implemented with a sequence of byte operations supplied from the FPGA 104 to the microprocessor port of the transmission convergence device 110 via the utility bus 108.

The line card 100 of FIG. 8 demonstrates that the in-band device configuration protocol of the invention can be implemented using a conventional transmission convergence device with only modest additional silicon resources. Although the invention is preferably implemented within a transmission convergence device, as described in conjunction with FIGS. 3 and 7, such that the utility bus 108 and its associated hardware are completed eliminated, the invention may also be implemented in external circuitry to be utilized with a conventional transmission convergence device, as described in conjunction with FIG. 8.

The present invention considerably simplifies line cards and the corresponding switches by eliminating the need to provide a separate global line card control interface. Advantageously, the invention provides line card control using an in-band device configuration, in which control information is transmitted between a control processor of a switch and one or more line cards of the switch within an existing cell data path. This in-band configuration provides a number of significant advantages in numerous ATM and other packet-based device applications. It can completely eliminate the need for a utility bus to interconnect multiple line cards, as well as the control hardware associated with the utility bus interface. It can reduce the number of input/output pins on a transmission convergence device, such that the device can be implemented with a smaller die, a smaller package and lower power dissipation. The in-band device configuration of the invention supports functions such as remote configuration, error reporting and statistics gathering for multiple line cards. For example, a remote agent can use the control processor of the ATM switch to access all line cards in the switch by sending control messages in ATM cells through the switch fabric. The protocol is robust, in that all messages are checked with a CRC to prevent a corrupted message from affecting line card hardware. Since all messages and all commands within a message can be acknowledged, a set of control software can readily determine the state of the line cards and can verify that requested actions are taken. By reducing the size, cost and complexity of line cards and increasing the reliability of control software, the in-band device configuration of the invention provides performance advantages in a wide variety of communication device applications.

The above-described embodiments of the invention are intended to be illustrative only. Numerous alternative embodiments within the scope of the following claims will be apparent to those skilled in the art. For example, a given control message may be spread out over several cells rather than contained in a single cell as in the illustrative embodiments.

What is claimed is:

1. A method for controlling a switch including at least one line card, the method comprising the steps of:

monitoring a stream of cells received by the line card, each of at least a subset of the cells including a header and a payload;

identifying at least one of the cells as including in its corresponding payload at least a portion of a control message directed to the line card from a processor in the switch;

executing a command associated with the control message in the line card, the execution of the command configuring the line card in a desired mode of operation at least in part by directing the writing of command-related payload data from the control message to designated locations in a memory of the line card, the memory locations being designated at least in part in the control message; and sending, in at least a portion of at least one cell directed from the line card to the processor, a response to the control message.

2. The method of claim 1 wherein the line card provides an interface between a cell-based signal path of the switch and a physical layer of a network.

3. The method of claim 1 wherein the monitoring and identifying steps are implemented at least in part in a filter which attempts to match at least a portion of a header of each of the cells in the stream with a specified address indicative of a control message.

4. The method of claim 1 wherein the control message is contained within a single one of the cells.

5. The method of claim 4 wherein the payload includes a plurality of commands, and the executing step includes executing the commands in sequence in the line card.

6. The method of claim 4 wherein the command includes an operation code field specifying an operation to be carried out in executing the command, an address field specifying an address of a line card memory location used by the operation, and a data field.

7. The method of claim 6 wherein the operation code specifies a read operation, the address field specifies an address in the line card memory of a memory location to be read during the read operation, and the data field will contain data read from the memory location during the read operation.

8. The method of claim 6 wherein the operation code specifies a write operation, the address field specifies an address in the line card memory of a memory location to be written during the write operation, and the data field contains data to be written to the memory location during the write operation.

9. The method of claim 4 wherein the payload includes a message trailer with a pass-through data field which is returned unmodified in the response from the line card as part of an acknowledgment of receipt and execution of the control message.

10. The method of claim 4 wherein the payload includes a message trailer with a device-specific data field which includes information specific to a transmission convergence device implemented on the line card.

11. The method of claim 10 wherein the device-specific data field includes one or more version bits which specify one of a number of different interpretations of the payload.

12. The method of claim 11 wherein the one or more version bits specify whether the payload includes a sequence of multiple commands, or a single command.

13. The method of claim 4 wherein the payload includes a message trailer with a cyclic redundancy code field, and wherein the method further includes the steps of computing a cyclic redundancy code over the payload of the cell, and rejecting the cell if the computed cyclic redundancy code does not match the cyclic redundancy code field of the message trailer.

14. An apparatus for processing cells in a switch including at least one line card, the apparatus comprising:
   a filter operative to monitor a stream of cells received by the line card, each of at least a subset of the cells including a header and a payload, and to identify at least one of the cells as including in its corresponding payload at least a portion of a control message directed to the line card; and
   a processor coupled to the filter and operative (i) to execute a command associated with the control message in the line card, the execution of the command configuring the line card in a desired mode of operation at least in part by directing the writing of command-related payload data from the control message to designated locations in a memory of the line card, the memory locations being designated at least in part in the control message, and (ii) to configure a response to the control message, wherein the response is sent to the switch in at least a portion of at least one cell.

15. The apparatus of claim 14 wherein the line card provides an interface between a cell-based signal path of the switch and a physical layer of a network.

16. The apparatus of claim 14 wherein the filter is operative to attempt to match at least a portion of a header of each of the cells in the stream with a specified address indicative of a control message.

17. The apparatus of claim 14 wherein the control message is contained within a single one of the cells.

18. The apparatus of claim 17 wherein the payload includes a plurality of commands, and the executing step includes executing the commands in sequence in the line card.

19. The apparatus of claim 17 wherein the command includes an operation code field specifying an operation to be carried out in executing the command, an address field specifying an address of a line card memory location used by the operation, and a data field.

20. The apparatus of claim 19 wherein the operation code specifies a read operation, the address field specifies an address in the line card memory of a memory location to be read during the read operation, and the data field will contain data read from the memory location during the read operation.

21. The apparatus of claim 19 wherein the operation code specifies a write operation, the address field specifies an address in the line card memory of a memory location to be written during the write operation, and the data field contains data to be written to the memory location during the write operation.

22. The apparatus of claim 17 wherein the payload includes a message trailer with a pass-through data field which is returned unmodified in the response from the line card as part of an acknowledgment of receipt and execution of the control message.

23. The apparatus of claim 17 wherein the payload includes a message trailer with a device-specific data field which includes information specific to a transmission convergence device implemented on the line card.

24. The apparatus of claim 23 wherein the device-specific data field includes one or more version bits which specify one of a number of different interpretations of the payload.

25. The apparatus of claim 24 wherein the one or more version bits specify whether the payload includes a sequence of multiple commands, or a single command.

26. The apparatus of claim 17 wherein the payload includes a message trailer with a cyclic redundancy code field, and wherein the method further includes the steps of computing a cyclic redundancy code over the payload of the cell, and rejecting the cell if the computed cyclic redundancy code does not match the cyclic redundancy code field of the message trailer.

27. A switch for use in a communication network, the switch comprising:
   a control processor;
   a switch fabric coupled to the control processor; and
   at least one line card coupled to the switch fabric, wherein the line card is operative to monitor a stream of cells received by the line card, each of at least a subset of the cells including a header and a payload, to identify at least one of the cells as including in its corresponding payload at least a portion of a control message directed to the line card, to execute a command associated with the control message, the execution of the command configuring the line card in a desired mode of operation at least in part by directing the writing of command-related payload data from the control message to designated locations in a memory of the line card, the memory locations being designated at least in part in the control message, and to send to the control processor, in at least a portion of at least one cell, a response to the control message.

28. The switch of claim 27 wherein the line card includes a transmission convergence device which interfaces with an asynchronous transfer mode port of the switch fabric.

29. The switch of claim 27 wherein the transmission convergence device includes a filter for implementing the monitor and identify operations of the line card.

30. The switch of claim 27 wherein the transmission convergence device includes a control cell processor for implementing the command execution operations of the line card.

31. A transmission convergence device for processing cells in a switch including at least one line card, the device comprising:

a filter operative to monitor a stream of cells received by the line card, each of at least a subset of the cells including a header and a payload, and to identify at least one of the cells as including in its corresponding payload at least a portion of a control message directed to the line card;

a cell buffer for storing the at least one cell including the portion of the control message;

a cell processor coupled to the filter for executing a command associated with the control message in the line card, the execution of the command configuring the line card in a desired mode of operation at least in part by directing the writing of command-related payload data from the control message to designated locations in a memory of the line card, the memory locations being designated at least in part in the control message; and a merge unit coupled to the cell processor and operative to direct an acknowledgment of the control message to a control processor of the switch, in at least a portion of at least one cell.

* * * * *